United States Patent
Kato et al.

(10) Patent No.: US 8,076,041 B2
(45) Date of Patent: Dec. 13, 2011

(54) FUEL CELL

(75) Inventors: Chisato Kato, Aichi-ken (JP); Koichiro Yamashita, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 854 days.

(21) Appl. No.: 12/084,551

(22) PCT Filed: Oct. 18, 2006

(86) PCT No.: PCT/JP2006/321186
§ 371 (c)(1),
(2), (4) Date: May 5, 2008

(87) PCT Pub. No.: WO2007/058054
PCT Pub. Date: May 24, 2007

(65) Prior Publication Data
US 2009/0148746 A1  Jun. 11, 2009

(30) Foreign Application Priority Data
Nov. 16, 2005  (JP) .................................. 2005-331009

(51) Int. Cl.
*H01M 2/20* (2006.01)
(52) U.S. Cl. ........ 429/468; 429/405; 429/408; 429/410; 429/412; 429/413; 429/414; 429/417; 429/422; 429/471
(58) Field of Classification Search .................. 429/405, 429/408, 410, 412, 413, 414, 417, 422, 468, 429/471
See application file for complete search history.

(56) References Cited

U.S. PATENT DOCUMENTS

| | | | |
|---|---|---|---|
| 2003/0215693 A1* | 11/2003 | Asai et al. | 429/38 |
| 2004/0157099 A1 | 8/2004 | Kato et al. | |
| 2004/0265667 A1* | 12/2004 | Kato et al. | 429/32 |

FOREIGN PATENT DOCUMENTS

JP  2-220364 A  9/1990

(Continued)

OTHER PUBLICATIONS

Office Action issued Aug. 2, 2011 in Japanese Patent Application No. 2007-545184 and partial English translation thereof.

*Primary Examiner* — Patrick Ryan
*Assistant Examiner* — Ben Lewis
(74) *Attorney, Agent, or Firm* — Kenyon & Kenyon LLP (57) ABSTRACT

A heat insulating member is sandwiched by a first separator and a second separator. The heat insulating member functions as a heat insulating layer to prevent the temperature decrease of electricity generating cells. A first impurity removal flow path is formed in the space enclosed by the grooves on the surface of the second separator and a partition plate. A second impurity removal flow path is formed in the space enclosed by the grooves on the surface of a third separator and the partition plate. The impurity removal flow paths function as filters to remove the impurities contained in the reaction gases. A terminal functions as a current collecting layer to collect the electricity generated in the electricity generating cells. An end laminated body functions as a heat insulating layer to prevent the temperature decrease of the electricity generating cells, impurity removal layers to remove the impurities contained in the reaction gases and a current collecting layer to collect the electricity generated in the electricity generating cells.

7 Claims, 4 Drawing Sheets

FOREIGN PATENT DOCUMENTS

| | | |
|---|---|---|
| JP | 7-263013 | 10/1995 |
| JP | 7-326379 A | 12/1995 |
| JP | 10-228918 A | 8/1998 |
| JP | 2002-184449 A | 6/2002 |
| JP | 2003-3282135 A | 10/2003 |
| JP | 2003-338305 A | 11/2003 |
| JP | 2004-152502 A | 5/2004 |
| JP | 2004-296348 A | 10/2004 |
| JP | 2005-019223 A | 1/2005 |
| JP | 2005-166304 A | 6/2005 |
| WO | WO 2006/082911 A1 | 8/2006 |

* cited by examiner

FUEL CELL

This is a 371 national phase application of PCT/JP2006/321186 filed 18 Oct. 2006, claiming priority to Japanese Patent Application No. 2005-331009 filed 16 Nov. 2005, the contents of which are incorporated herein by reference.

TECHNICAL FIELD

The present invention relates to a fuel cell, and in particular to a stack structure of a fuel cell.

BACKGROUND ART

There have been known fuel cells in which the chemical energy obtained by reacting a hydrogen-containing fuel gas and an oxygen-containing oxidant gas with each other is transformed into electrical energy. In general, such fuel cells are formed by stacking a number of electricity generating cells in each of which the above-described chemical reaction is made to take place; each electricity generating cell has, for example, a structure in which a membrane electrode assembly is sandwiched by two sheets of separators.

Each of the plurality of the stacked electricity generating cells requires reaction gases (fuel gas and oxygen gas). Accordingly, in a fuel cell in which a plurality of electricity generating cells are stacked, gas flow paths for supplying reaction gases are formed, and the reaction gases are supplied to each electricity generating cell through the gas flow paths and the reaction gases are discharged from each electricity generating cell. In connection with this requirement, there have hitherto been proposed various techniques related to the stack structures of fuel cells which take into consideration the supply and discharge of the reaction gases.

For example, Patent Document 1 (Japanese Patent Laid-Open Publication No. 2003-338305) discloses a stack structure in which a dummy cell provided with an impurity removal function is disposed on one end of the stacking direction of a plurality of electricity generating cells. In this structure, the dummy cell functions as a filter to remove impurities from the reaction gases. In other words, the impurities contained in the reaction gases are removed by the dummy cell, and thereafter the reaction gases are supplied to the plurality of electricity generating cells. Consequently, the impurities (such as condensed water from humidified gas and metal ions from gas supply pipes) contained in the reaction gases are suppressed in flowing into the electricity generating cells, and the output power decrease is thereby suppressed.

Additionally, there is a possibility that the electricity generating cells are decreased in output power when the temperature is decreased, in association with generation of condensed water or the like. Accordingly, there has been proposed a technique related to a stack structure in which the temperature decrease of electricity generating cells is taken into consideration.

For example, Patent Document 2 (Japanese Patent Laid-Open Publication No. 2002-184449) discloses a technique to prevent the temperature decrease of the electricity generating cells by providing a terminal plate with an air chamber to function as a heat insulating layer; Patent Document 3 (Japanese Patent Laid-Open Publication No. 2005-19223) discloses a technique in which a dummy cell including a plurality of spaces is interposed between a terminal plate and an adjacent electricity generating cell and the dummy cell is used as a heat insulating layer; and Patent Document 4 (Japanese Patent Laid-Open Publication No. 2004-152502) discloses a technique in which an air layer to function as a heat insulating layer is formed between a terminal plate and an electricity generating cell.

As described above, there have hitherto been proposed various techniques related to functions such as a function to remove the impurities contained in the reaction gases and a function to prevent the temperature decrease of the electricity generating cells.

DISCLOSURE OF THE INVENTION

As described above, a fuel cell includes, in addition to a stack of electricity generating cells, a structure to perform impurity removal function, a structure to perform heat insulating function and a structure such as a terminal plate to perform current collecting function. As each single cell has only one function, it has hitherto been necessary to stack two or more non-electricity generating cells in order to provide all the desired functions. Consequently, there are commonly two or more structures to support electricity generation such as a current collecting structure, a heat insulating structure and an impurity removal structure, and hence, for example, there is a fear that the number of parts in a fuel cell as a whole is increased, and the fuel cell is thereby elongated in the stacking direction.

Under such circumstances, the present inventors have continued research and development of the stack structure of fuel cells each of which simultaneously provide two or more functions supporting electricity generation.

Against this background, the present invention achieves the object of providing an improved technique related to the structure of fuel cell stacks.

For the purpose of achieving the above-described object, a fuel cell according to one aspect of the present invention includes an electricity generating cell to contribute to electricity generation, including a membrane electrode assembly and including a separator having an oxidant gas flow path and a separator having a fuel gas flow path sandwiching the membrane electrode assembly; a non-electricity generating cell not to contribute to electricity generation, including no membrane electrode assembly; and a stack in which the electricity generating cell and the non-electricity generating cell are stacked, wherein the non-electricity generating cell includes a plurality of layers different from each other in function.

In the above-described structure, the plurality of layers different from each other in function refers to, for example, an impurity removal layer to remove the impurities contained in the reaction gases, a heat insulating layer to prevent the temperature decrease of the electricity generating cells and a current collecting layer to collect the electricity generated in the electricity generating cells.

Another preferred aspect is characterized in that the non-electricity generating cell is stacked on the end of the stacking direction of a plurality of electricity generating cells, and of the plurality of the layers forming the non-electricity generating cell, the heat insulating layer is disposed so as to be nearest to the electricity generating cell side. According to this structure, the heat insulating layer is disposed in the vicinity of the electricity generating cells, and hence can reduce the amount of heat released from the electricity generating cells.

Another preferred aspect is characterized in that the non-electricity generating cell includes a current collecting layer in addition to the impurity removal layer and the heat insulating layer, and the current collecting layer, the impurity removal layer and the heat insulating layer are laminated in this order toward the electricity generating cell side. A further preferred aspect is characterized in that the impurity removal layer is formed by the impurity removal flow path formed in the current collecting layer. With this structure, the current collecting layer and the impurity removal layer can be compactly formed in a single cell, and the number of parts can therefore also be reduced.

Another preferred aspect is characterized in that the non-electricity generating cell includes a current collecting layer in addition to the impurity removal layer and the heat insulating layer; the current collecting layer includes a conductive plate; the impurity removal layer includes a filter member including an impurity removal flow path; the heat insulating layer includes a heat insulating member; and the conductive plate, the heat insulating member and the filter member are laminated in this order. With this structure, it is not necessary to machine the conductive plate, and, because the filter member required to have sealing property is not brought into contact with the conductive plate, it is also not necessary to consider the sealing with the conductive plate that is narrow in the choice range of sealing agents.

Another preferred aspect is characterized in that the fuel cell includes a filter plate having grooves on the surface of the filter plate and a heat insulating separator to function as the heat insulating layer, wherein an impurity removal flow path enclosed by the grooves of the filter plate and the heat insulating separator is formed by laminating the heat insulating separator on the surface of the filter plate; and the formed impurity removal flow path functions as the impurity removal layer. By employing this structure, the impurity removal layer and the heat insulating layer can be compactly formed.

Another preferred aspect is characterized in that the impurity removal layer is a layer that bypasses an electricity generation performance degrading substances from a gas supply manifold to a gas discharge manifold. Here, the electricity generation performance degrading substance means, for example, an impurity, an impurity-containing liquid or condensed water.

The present invention provides a technique for improving the stack structure of fuel cells. This technique enables, for example, a heat insulating layer to be disposed in the vicinity of electricity generating cells, and the heat release from the electricity generating cells to be reduced. Additionally, for example, an impurity removal layer and a heat insulating layer can be formed in a single cell.

BEST MODE FOR CARRYING OUT THE INVENTION

Hereinafter, preferred embodiments of the present invention are described with reference to the accompanying drawings.

Figure 1:
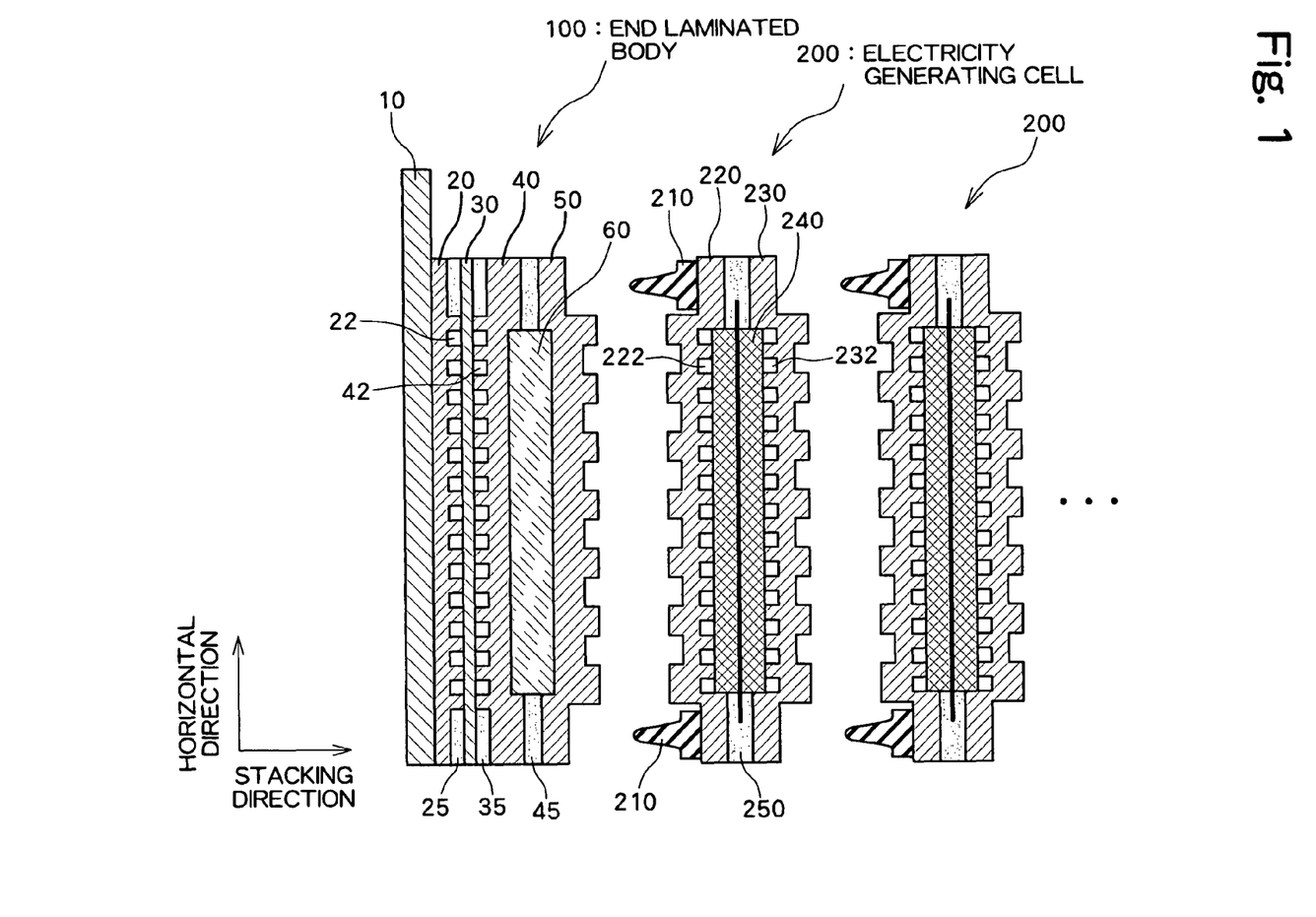
FIG. 1 is partial sectional views illustrating the stack structure of a fuel cell according to the present invention.

FIG. 1 illustrates a first preferred embodiment of the present invention, and is a partial sectional view illustrating a cell stack structure of a fuel cell according to the present invention. The fuel cell of the present embodiment includes a plurality of electricity generating cells 200 and an end laminated body 100.

The electricity generating cell 200 is a plate-like cell having a thickness in the stacking direction, and generates electricity by using a hydrogen-containing fuel gas and an oxygen-containing oxidant gas. The electricity generating cell 200 is a structure in which a membrane electrode assembly (MEA) 240 is sandwiched by two sheets of separators 220 and 230. A gas supply path 222 is formed between the MEA 240 and the separator 220, and another gas supply path 232 is formed between the MEA 240 and the separator 230. A sealing agent 250 is interposed between the two sheets of the separators 220 and 230.

The reaction gases used for electricity generation are supplied to the gas supply paths 222 and 232. For example, a hydrogen-containing fuel gas is supplied to the gas supply path 222, and an oxygen-containing oxidant gas is supplied to the gas supply path 232. Thus, the electricity generating cells 200 generate electricity by using the supplied reaction gases.

A gasket 210 is attached to the separator 220 of the electricity generating cell 200. In the configuration shown in FIG. 1, two sheets of the electricity generating cells 200 are illustrated in a state separated from each other; however, when a cell stack is formed, the two sheets of the electricity generating cells 200 are brought into contact with each other. In other words, the separator 230 of one electricity generating cell 200 and the separator 220 of the other electricity generating cell 200 are bonded to each other. A flow path of cooling water is formed between the separator 230 of one electricity generating cell 200 and the separator 220 of the other electricity generating cell 200, and the gasket 210 functions as a sealing member.

As described above, in the fuel cell of the present embodiment, the plurality of the electricity generating cells 200 are stacked. The two sheets of the electricity generating cells 200 shown in FIG. 1 correspond to the cells at the end of the stacking direction of the plurality of the electricity generating cells 200. In the present embodiment, the end laminated body 100 is further stacked on the end of the stacking direction of the plurality of the electricity generating cells 200. In FIG. 1, the end laminated body 100 and the end electricity generating cell 200 adjacent to the end laminated body 100 are illustrated in a state separated from each other. When a cell stack is formed, the end laminated body 100 and the end electricity generating cell 200 are brought into contact with each other. In other words, the separator 220 of the end electricity generating cell 200 and the end laminated body 100 are bonded to each other. A cooling water flow path is formed between the separator 220 of the end electricity generating cell 200 and the end laminated body 100, and the gasket 210 functions as a sealing member.

Next, the structure of the end laminated body 100 will be described. Similar to the electricity generating cell 200, the end laminated body 100 is also formed in a plate-like shape with a thickness in the stacking direction, however the end laminated body 100 also includes a terminal 10 which projects from the component. In the portion in contact with the end electricity generating cell 200, a separator 50 is disposed. A separator 40 is disposed so as to face the separator 50. A heat insulating member 60 is sandwiched by the separator 50 and the separator 40. The heat insulating member 60 functions as a heat insulating layer to prevent the temperature decrease of the electricity generating cells 200. A sealing agent 45 is filled in the gap between the separator 50 and the separator 40.

The separator 40 and the separator 50 also provide the function of conducting the electricity generated in the electricity generating cells 200 to the terminal 10. Accordingly, the separator 40 and the separator 50 are each formed of a conductive material such as a SUS material or carbon. For the purpose of efficiently conducting the electricity generated in the electricity generating cells 200 to the terminal 10, the heat insulating member 60 is preferably provided with satisfactory conductivity. Accordingly, the heat insulating member 60 is formed of, for example, a porous ceramic material.

Further, a separator 20 is disposed so as to face the separator 40, and a partition plate 30 is sandwiched by the separator 40 and the separator 20. The separator 40 and the separator 20 have grooves formed on the surfaces thereof facing each other. An impurity removal flow path 42 is formed in the space enclosed by the grooves on the surface of the separator 40 and the partition plate 30, and an impurity removal flow path 22 is formed in the space enclosed by the grooves on the surface of the separator 20 and the partition plate 30. A sealing agent 35 is filled in the gap between the separator 40 and the partition plate 30, and a sealing agent 25 is filled in the gap between the separator 20 and the partition plate 30.

The impurity removal flow paths 22 and 42 function as filters to remove the impurities contained in the reaction gases. In other words, the portion constituted with the separator 40, the partition plate 30 and the separator 20 functions as an impurity removal layer.

The reaction gases are made to pass through the impurity removal flow paths 22 and 42 so as to remove the impurities thereof, and are thereafter supplied to the electricity generating cells 200. The two types of reaction gases, namely, the hydrogen-containing fuel gas and the oxygen-containing oxidant gas are made to pass through the flow paths corresponding respectively to these gases to be supplied to the electricity generating cells 200. Accordingly, in the present embodiment, two types of flow paths respectively corresponding to the two types of reaction gases are partitioned by the partition plate 30.

Additionally, most of the impurities contained in the reaction gases are melted or mixed in the condensed liquid derived from the humidifying water in the reaction gases, and pass through gas supply manifolds to flow into the stack in which the plurality of the electricity generating cells 200 and the end laminated body 100 are stacked. The impurity removal flow paths 22 and 42 are disposed at the positions upstream of the electricity generating cells 200 in the reaction gas flow paths, and hence when these impurity-containing liquids flow into the stack, these impurity-containing liquids pass through the impurity removal flow paths 22 and 42 and are bypassed into gas discharge manifolds. Thus, the reaction gases reduced in the impurity concentrations are supplied to the electricity generating cells 200. Additionally, when ordinary condensation containing no impurities flows into the electricity generating cells 200, the collected water from the condensation degrades the electricity generation performance. Accordingly, the electricity generation performance can also be improved by bypassing superfluous condensed water with the aid of the impurity removal flow paths 22 and 42 from the gas supply manifolds into the gas discharge manifolds.

In the above-described example, the impurity removal flow paths 22 and 42 are designed to be the bypass flow paths communicatively connected to the gas supply manifolds and the gas discharge manifolds; however, these impurity removal flow paths are not limited to bypass flow paths and may also be blind alley-type flow paths as long as the impurity removal flow paths have functions to reduce the impurities from the reaction gases.

In other words, the impurity removal flow path 22 on the contact side between the separator 20 and the partition plate 30 is connected to, for example, the fuel gas flow path; the impurities contained in the fuel gas are removed by the impurity removal flow path 22; and then the fuel gas is supplied to the electricity generating cells 200. Additionally, the impurity removal flow path 42 on the contact side between the separator 40 and the partition plate 30 is connected to, for example, the oxidant gas flow path; the impurities contained in the oxidant gas are removed by the impurity removal flow path 42; and then the oxidant gas is supplied to the electricity generating cells 200.

The separator 20, the partition plate 30, and the separator 40 are respectively brought into contact with the reaction gases and are required to ensure the corrosion resistance to the reaction gases, and are provided with conductivity for the purpose of efficiently conducting the electricity generated in the electricity generating cells 200 to the terminal 10. Accordingly, the separator 20, the partition plate 30 and the separator 40 are each formed of, for example, a SUS material or carbon.

The terminal 10 functions as the current collecting layer to collect the electricity generated in the electricity generating cells 200. In other words, the electricity generated in the electricity generating cells 200 is collected in the terminal 10 in a manner conductively passing through the individual portions of the end laminated body 100. The terminal 10 is preferably a conductive plate low both in the electrical resistance in the cell stacking direction (vertical direction) and in the electrical resistance in the horizontal direction. Accordingly, the terminal 10 is formed of, for example, copper.

As described above, the end laminated body 100 shown in FIG. 1 functions as the heat insulating layer to prevent the temperature decrease of the electricity generating cells 200, the impurity removal layer to remove the impurities contained in the reaction gases, and the current collecting layer to collect the electricity generated in the electricity generating cells 200. Of these layers, the heat insulating member 60 intended to function as the heat insulating layer is disposed so as to be nearest to the electricity generating cells 200, to thus inhibit heat transfer to the other members in the end laminated body 100 and reduce the amount of heat released from the electricity generating cells 200.

Additionally, the heat insulating member 60 functioning as the heat insulating layer and the impurity removal flow paths 22 and 42 functioning as the impurity removal layers are formed into a ginel cell with the aid of the separators 20, 40 and 50, and therefore can be formed more compactly then the combined size when the heat insulating layer and the impurity removal layers are formed in separate cells.

Figure 2:
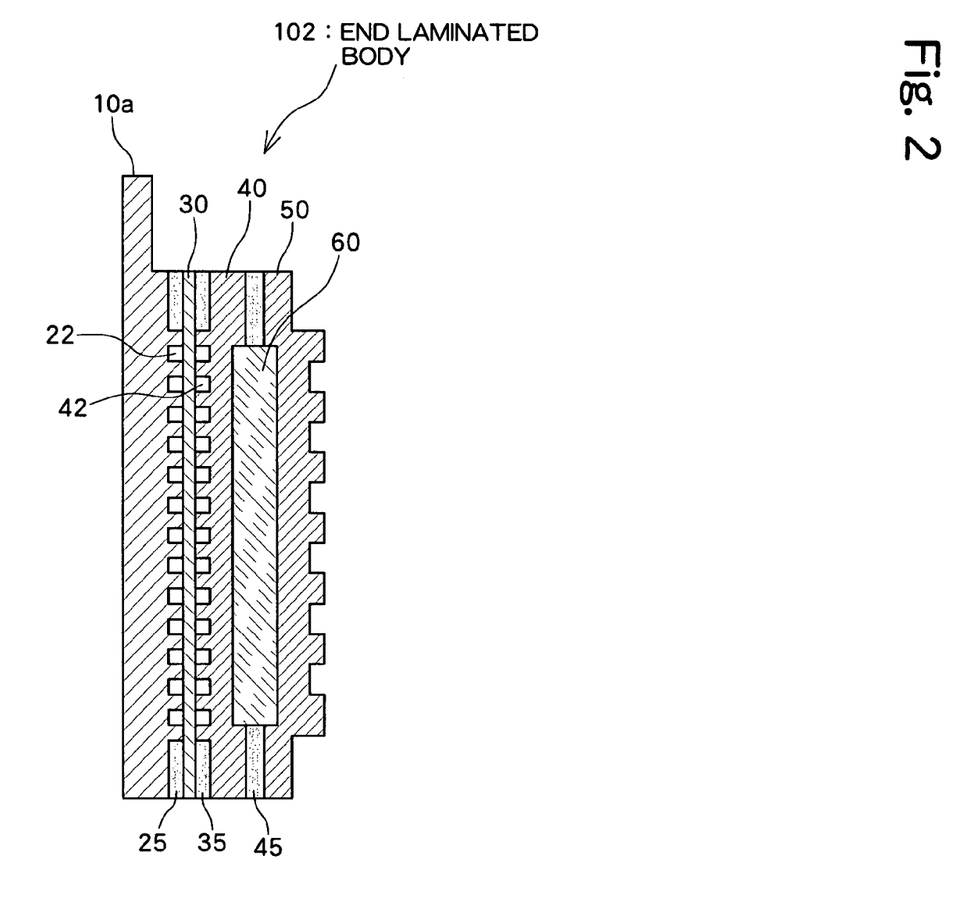
FIG. 2 is a view illustrating an end laminated body according to a second preferred embodiment of the present invention.

FIG. 2 is a view for illustrating a second preferred embodiment of the end laminated body of the fuel cell according to the present invention. The end laminated body 102 shown in FIG. 2 is used in place of the end laminated body 100 shown in FIG. 1. In other words, the end laminated body 102 is stacked on the end of the stacking direction of the plurality of the electricity generating cells (denoted by reference numeral 200 in FIG. 1).

The difference between the end laminated body 102 shown in FIG. 2 and the end laminated body 100 shown in FIG. 1 resides in that a terminal 10a is used in FIG. 2 in place of the separator 20 and the terminal 10 in FIG. 1.

The end laminated body 102 shown in FIG. 2 is a structure in which the heat insulating member 60 formed of, for example, a porous ceramic material is sandwiched by the separator 50 and the separator 40 formed of, for example, a SUS material or carbon. The sealing agent 45 is filled in the gap between the separator 50 and the separator 40.

Additionally, the partition plate 30 is sandwiched by the separator 40 and the terminal 10a. The separator 40 and the terminal 10a have grooves formed on the surfaces thereof facing each other. The impurity removal flow path 42 is formed in the space enclosed by the grooves on the surface of the separator 40 and the partition plate 30, and the impurity removal flow path 22 is formed in the space enclosed by the grooves on the surface of the terminal 10a and the partition plate 30. The sealing agent 35 is filled in the gap between the separator 40 and the partition plate 30, and the sealing agent 25 is filled in the gap between the terminal 10a and the partition plate 30.

Also in the end laminated body 102 shown in FIG. 2, the impurity removal flow path 22 is connected to, for example, the fuel gas flow path, the impurities contained in the fuel gas are removed by the impurity removal flow path 22, and then the fuel gas is supplied to the electricity generating cells; additionally, the impurity removal flow path 42 is connected to, for example, the oxidant gas flow path, the impurities contained in the oxidant gas are removed by the impurity removal flow path 42, and then the oxidant gas is supplied to the electricity generating cells.

In the end laminated body 102 shown in FIG. 2, grooves to serve as the impurity removal flow path 22 are formed on the terminal 10a and thus a part of the terminal 10a functions as an impurity removal layer. The terminal 10a also functions as a current collecting layer to collect the electricity generated in the electricity generating cells. In other words, the electrical energy generated in the electricity generating cells is collected in the terminal 10a by being conducted through the individual portions of the end laminated body 102.

As described above, the terminal 10a functions as a current collecting layer. Accordingly, in consideration of an aspect of conductivity, the terminal 10a is preferably formed of, for example, copper, similarly to the case of the terminal 10 shown in FIG. 1. However, the terminal 10a also functions as the impurity removal layer, and hence is brought into contact with the reaction gas flowing in the impurity removal flow path 22. Accordingly, when the terminal 10a is formed of copper, the part thereof serving as the impurity removal flow path 22 is preferably subjected to a treatment such as an anti-corrosion treatment. In consideration of an aspect of corrosion resistance, the terminal 10a may be formed of, for example, a SUS material or carbon.

The end laminated body 102 shown in FIG. 2 functions as a heat insulating layer to prevent the temperature decrease of the electricity generating cells, an impurity removal layer to remove the impurities contained in the reaction gases and a current collecting layer to collect the electricity generated in the electricity generating cells. Of these layers, because the heat insulating member 60 to function as the heat insulating layer is disposed so as to be nearest to the electricity generating cells, heat transfer to the other members in the end laminated body 102 can be inhibited, and the amount of heat released from the electricity generating cells can be reduced.

Further, in the end laminated body 102 shown in FIG. 2, the terminal 10a functions as the impurity removal layer in addition to functioning as the current collecting layer, and the number of the components can therefore be reduced compared to a case wherein the functions of the current collecting layer and the impurity removal layer are provided using two members, such as the separator 20 and the terminal 10 used in the end laminated body 100 shown in FIG. 1; thus, with the present embodiment, the structure can be made still more compact.

Figure 3:
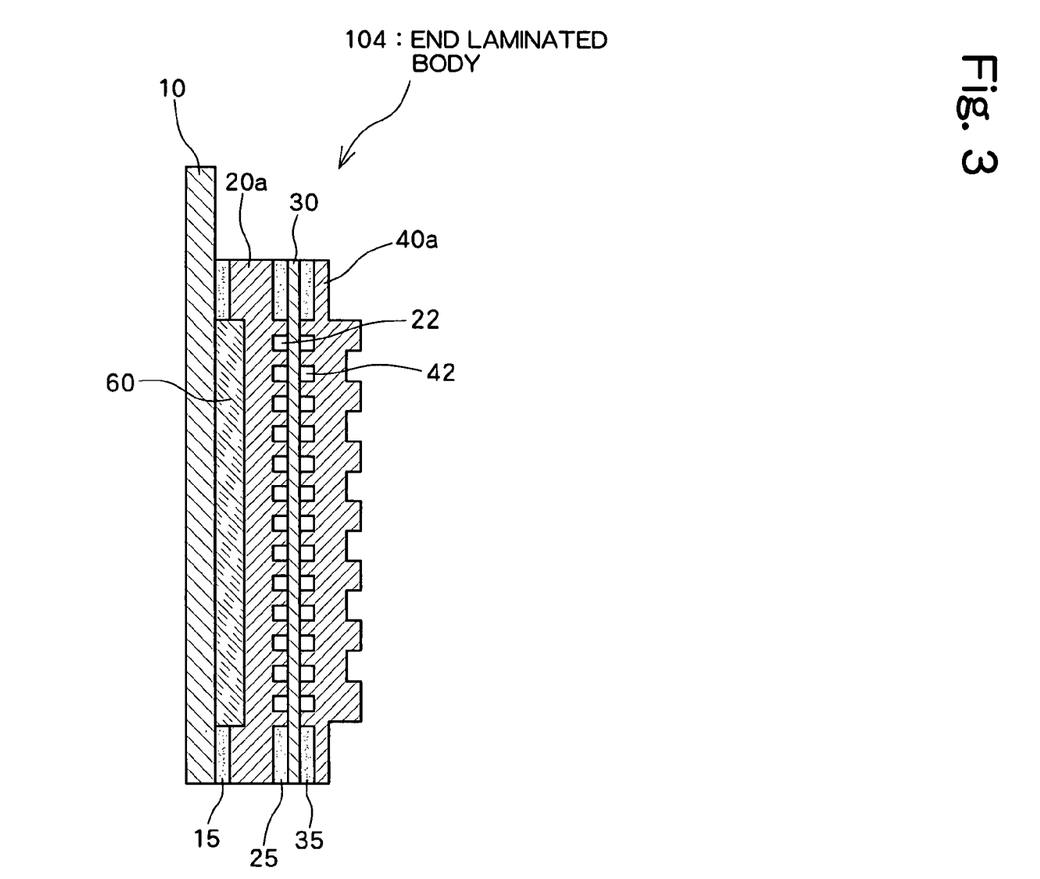
FIG. 3 is a view illustrating an end laminated body according to a third preferred embodiment of the present invention.

FIG. 3 is a view for illustrating a third preferred embodiment of the end laminated body of the fuel cell according to the present invention. The end laminated body 104 shown in FIG. 3 is used in place of the end laminated body 100 shown in FIG. 1. In other words, the end laminated body 104 is stacked on the end of the stacking direction of the plurality of the electricity generating cells (denoted by reference numeral 200 in FIG. 1). In the end laminated body 104 shown in FIG. 3, the terminal 10 to function as a conductive plate, the heat insulating member 60, and the separators 20a and 40a to function as filter members are laminated in this order.

In the portion in contact with the electricity generating cell, a separator 40a is disposed. A separator 20a is disposed so as to face the separator 40a. The partition plate 30 is sandwiched by the separator 40a and the separator 20a. The separator 40a and the separator 20a have grooves formed on the surfaces thereof facing each other.

The impurity removal flow path 42 is formed in the space enclosed by the grooves on the surface of the separator 40a and the partition plate 30, and the impurity removal flow path 22 is formed in the space enclosed by the grooves on the surface of the separator 20a and the partition plate 30. The sealing agent 35 is filled in the gap between the separator 40a and the partition plate 30, and the sealing agent 25 is filled in the gap between the separator 20a and the partition plate 30. The separator 20a and the separator 40a are formed of, for example, a SUS material or carbon.

Also in the end laminated body 104 shown in FIG. 3, the impurity removal flow path 22 is connected to, for example, the fuel gas flow path, the impurities contained in the fuel gas are removed through the impurity removal flow path 22, and then the fuel gas is supplied to the electricity generating cells; additionally, the impurity removal flow path 42 is connected to, for example, the oxidant gas flow path, the impurities contained in the oxidant gas are removed by the impurity removal flow path 42, and then the oxidant gas is supplied to the electricity generating cells.

Further, in the end laminated body 104 shown in FIG. 3, the heat insulating member 60 is disposed between the separator 20a and the terminal 10 so as to form a structure in which the heat insulating member 60 is sandwiched by the separator 20a and the terminal 10. The heat insulating member 60 is formed of, for example, a porous ceramic material and the terminal 10 is formed of, for example, copper.

In the end laminated body 104 shown in FIG. 3, it is not necessary that the terminal 10 to function as the current collecting layer be provided with a flow path to function as an impurity removal layer and a flow path for cooling water. Additionally, the terminal 10 is not brought into contact with the reaction gases and the cooling water, and hence is not required to have high corrosion resistance; thus, even when the terminal 10 is formed of copper or the like, anti-corrosion treatment can be omitted. Further, a sealing agent 15 to be filled in the gap between the separator 20a and the terminal 10 may be omitted.

Figure 4:
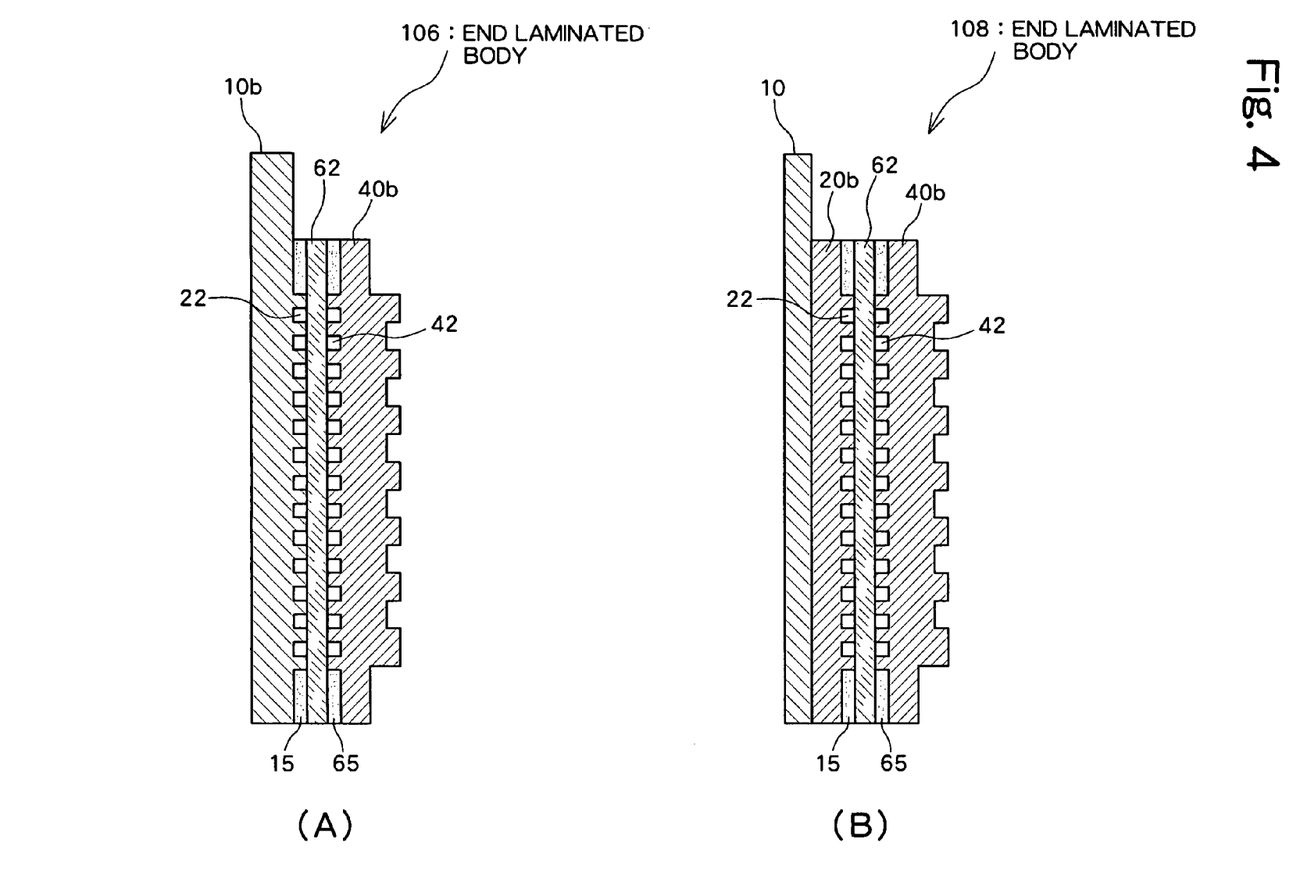
FIG. 4 is views illustrating an end laminated body according to a fourth preferred embodiment of the present invention.

FIG. 4 is a view for illustrating a fourth preferred embodiment of the end laminated body of the fuel cell according to the present invention. The end laminated body 106 shown in FIG. 4(A) and the end laminated body 108 shown in FIG. 4(B) are respectively used in place of the end laminated body 100 shown in FIG. 1. In other words, the end laminated bodies 106 and 108 are each stacked on the end of the stacking direction of the plurality of the electricity generating cells (denoted by reference numeral 200 in FIG. 1).

In the end laminated body 106 shown in FIG. 4(A), a separator 40b to function as a filter plate is disposed in the portion in contact with the electricity generating cell. The separator 40b is formed of, for example, a SUS material or carbon. A terminal 10b is disposed so as to face the separator 40b, and a heat insulating separator 62 is sandwiched by the separator 40b and the terminal 10b. The separator 40b and the terminal 10b have grooves formed on the surfaces thereof facing each other.

The impurity removal flow path 42 is formed in the space enclosed by the grooves on the surface of the separator 40b and the heat insulating separator 62, and the impurity removal flow path 22 is formed in the space enclosed by the grooves on the surface of the terminal 10b and the heat insulating separator 62. A sealing agent 65 is filled in the gap between the separator 40b and the heat insulating separator 62, and the sealing agent 15 is filled in the gap between the terminal 10b and the heat insulating separator 62.

Also in the end laminated body 106 shown in FIG. 4(A), the impurity removal flow path 22 is connected to, for example, the fuel gas flow path, the impurities contained in the fuel gas are removed by the impurity removal flow path 22, and then the fuel gas is supplied to the electricity generating cells; additionally, the impurity removal flow path 42 is connected to, for example, the oxidant gas flow path, the impurities contained in the oxidant gas are removed by the impurity removal flow path 42, and then the oxidant gas is supplied to the electricity generating cells.

In the end laminated body 106 shown in FIG. 4(A), the heat insulating separator 62 has a function as a heat insulating layer and a function to partition the impurity removal flow paths 22 and 42. Accordingly, the heat insulating separator 62 is required to have the corrosion resistance against the reaction gases in addition to the heat insulating function. Additionally, for the purpose of collecting the electricity generated in the electricity generating cells into the terminal 10b, the heat insulating separator 62 must be conductive. Accordingly, the heat insulating separator 62 is formed of, for example, a PTFE material having closed cells and containing carbon as binder.

Additionally, the terminal 10b functions as a current collecting layer. Accordingly, in consideration of the aspect of conductivity, the terminal 10b is preferably formed of, for example, copper or the like. However, the terminal 10b also functions as the impurity removal layer, and hence is brought into contact with the reaction gas flowing in the impurity removal flow path 22. Accordingly, when the terminal 10b is formed of copper, the part thereof serving as the impurity removal flow path 22 is preferably subjected to a treatment such as an anti-corrosion treatment. Therefore, in consideration of corrosion resistance, the terminal 10b may be formed of, for example, a SUS material or carbon.

In the end laminated body 106 shown in FIG. 4(A), the terminal 10b functions as the impurity removal layer in addition to the function as the current collecting layer, and the heat insulating separator 62 simultaneously has a function as a heat insulating layer and a function to partition the impurity removal flow paths 22 and 42. In this manner, each member has two or more functions, and hence in the end laminated body 106 shown in FIG. 4(A), a further compact structure can be actualized as compared to, for example, the end laminated bodies shown in FIGS. 1 to 3.

The end laminated body 108 shown in FIG. 4(B) is a structure obtained by modifying the end laminated body 106 shown in FIG. 4(A). The difference between the end laminated body 108 shown in FIG. 4(B) and the end laminated body 106 shown in FIG. 4(A) resides in that the terminal 10 and a separator 20b are used in FIG. 4(B) in place of the terminal 10b in FIG. 4(A).

In the end laminated body 108 shown in FIG. 4(B), the separator 40b is formed of, for example, a SUS material or carbon. The separator 20b is disposed so as to face the separator 40b, and the heat insulating separator 62 is sandwiched by the separator 40b and the separator 20b. The separator 40b and the separator 20b each have grooves formed on the surfaces thereof facing each other.

The impurity removal flow path 42 is formed in the space enclosed by the grooves on the surface of the separator 40b and the heat insulating separator 62, and the impurity removal flow path 22 is formed in the space enclosed by the grooves on the surface of the separator 20b and the heat insulating separator 62. The sealing agent 65 is filled in the gap between the separator 40b and the heat insulating separator 62, and the sealing agent 15 is filled in the gap between the separator 20b and the heat insulating separator 62. Further, the terminal 10 to function as the current collecting layer is laminated on the separator 20b.

In the end laminated body 108 shown in FIG. 4(B), the terminal 10 to function as the current collecting layer and the separator 20b to function as the impurity removal layer can be formed of different materials. Accordingly, for the terminal 10, copper, for example, can be used when conductivity is regarded as a more important consideration, while, for the separator 20b, a SUS material or carbon, for example, can be used where corrosion resistance is considered a more important consideration.

It should also be noted that any of the functions of the impurity removal flow path 22 and the impurity removal flow path 42 may be implemented in the heat insulating separator 62 by forming a reaction gas flow path in each of the heat insulating separators 62 in FIGS. 4(A) and 4(B).

Although illustrative preferred embodiments of the present invention have been described above, the above-described embodiments are intended only to provide illustrative examples, and should not be construed as limiting the scope of the present invention.

For example, although in the examples used to describe the embodiments with reference to FIGS. 1 to 4, a double layer structure of the impurity removal flow paths 22 and 42 respectively corresponding to the two types of reaction gases is formed with the aid of the partition plate 30 or the heat insulating separator 62, a structure may also be adopted as described in Patent Document 1 (see FIG. 1), in which flow paths respectively corresponding to two types of reaction gases are formed on one and the same surface.

When the flow paths respectively corresponding to the two types of reaction gases are formed in one and the same surface, the separator 20 described in the embodiment illustrated in FIG. 1 may be eliminated and flow paths (impurity removal flow paths) respectively corresponding to the two types of reaction gases may be formed on the contact surface between the separator 40 and the partition plate 30. Alternatively, for example, in the embodiment illustrated in FIG. 4, the separator 40b may be eliminated and flow paths respectively corresponding to the two types of reaction gases may be formed on the surface with the impurity removal flow path 22 formed thereon.

Although, in the embodiments described with reference to FIGS. 1 to 4, the heat insulating layer and the impurity removal flow paths are disposed so as to be nearer to the electricity generating cell side than the current collecting layer, a structure in which the current collecting layer is disposed so as to be nearer to the electricity generating cell side than the heat insulating layer and the impurity removal flow paths may alternatively be adopted.

The invention claimed is:

1. A fuel cell comprising:
an electricity generating cell to contribute to electricity generation, comprising a membrane electrode assembly and comprising a separator having an oxidant gas flow path and a separator having a fuel gas flow path sandwiching the membrane electrode assembly;

a non-electricity generating cell not to contribute to electricity generation, comprising no membrane electrode assembly; and a stack in which the electricity generating cell and the non-electricity generating cell are stacked;

wherein the non-electricity generating cell is stacked on the end of the stacking direction of a plurality of the electricity generating cells, and comprises a laminated structure in which a first separator, a heat insulating member, a second separator, a third separator and a terminal are laminated in this order from the electricity generating cell side, the heat insulating member is sandwiched by the first separator and the second separator to reduce the heat release from the electricity generating cells, an impurity removal flow path is formed between the second separator and the third separator, and the impurities contained in a fluid supplied to the stack are removed by the impurity removal flow path, and the terminal collects the electricity generated in the electricity generating cells.

2. The fuel cell according to claim 1,
wherein the fuel cell comprises a partition plate sandwiched by the second separator and the third separator, and the impurity removal flow path is partitioned by the partition plate into two types of paths respectively corresponding to two types of reaction gases, namely, an oxidant gas and a fuel gas.

3. The fuel cell according to claim 1,
wherein the heat insulating member is formed of a porous ceramic material.

4. The fuel cell according to claim 1,
wherein the third separator and the terminal are mutually integrated into one piece so as to be formed of one member.

5. A fuel cell comprising:
an electricity generating cell to contribute to electricity generation, comprising a membrane electrode assembly and comprising a separator having an oxidant gas flow path and a separator having a fuel gas flow path sandwiching the membrane electrode assembly;

a non-electricity generating cell not to contribute to electricity generation, comprising no membrane electrode assembly; and a stack in which the electricity generating cell and the non-electricity generating cell are stacked;

wherein the non-electricity generating cell is stacked on the end of the stacking direction of a plurality of the electricity generating cells, and comprises a laminated structure in which a first separator, a second separator, a heat insulating member and a terminal are laminated in this order from the electricity generating cell side, an impurity removal flow path is formed between the first separator and the second separator, and the impurities contained in a fluid supplied to the stack are removed by the impurity removal flow path, the heat insulating member is sandwiched by the second separator and the terminal to reduce the heat release from the electricity generating cells, and the terminal collects the electricity generated in the electricity generating cells.

6. The fuel cell according to claim 5,
wherein the fuel cell comprises a partition plate sandwiched by the first separator and the second separator, and the impurity removal flow path is partitioned by the partition plate into two types of paths respectively corresponding to two types of reaction gases, namely, an oxidant gas and a fuel gas.

7. The fuel cell according to claim 5,
wherein the heat insulating member is formed of a porous ceramic material.

* * * * *

UNITED STATES PATENT AND TRADEMARK OFFICE
CERTIFICATE OF CORRECTION

PATENT NO. : 8,076,041 B2
APPLICATION NO. : 12/084551
DATED : December 13, 2011
INVENTOR(S) : Chisato Kato et al.

Page 1 of 1

It is certified that error appears in the above-identified patent and that said Letters Patent is hereby corrected as shown below:

On the Title Page, item:

Replace "(75) Inventors: Chisato Kato, Aichi-ken (JP); Koichiro Yamashita, Toyota (JP)"

with

--(75) Inventors: Chisato Kato, Aichi-gun (JP); Koichiro Yamashita, Toyota (JP)--.

Signed and Sealed this
Eighteenth Day of December, 2012

David J. Kappos
*Director of the United States Patent and Trademark Office*